United States Patent [19]

Schobl

[11] 4,341,118
[45] Jul. 27, 1982

[54] TEMPERATURE VERIFICATION APPARATUS

[75] Inventor: Howard T. Schobl, Coraopolis, Pa.

[73] Assignee: Schobl Enterprises, Coraopolis, Pa.

[21] Appl. No.: 173,054

[22] Filed: Jul. 28, 1980

[51] Int. Cl.³ .................. G01K 5/72; G01D 11/16; G01D 13/24
[52] U.S. Cl. .................. 116/221; 116/294; 116/295; 374/106
[58] Field of Search .............. 73/363.7; 116/294, 295, 116/296, 297, DIG. 10; 206/493

[56] References Cited

U.S. PATENT DOCUMENTS

| 1,787,327 | 12/1930 | Schlaich | 73/350 |
| 2,037,874 | 4/1936 | Bandoly | 73/363.7 |
| 2,681,635 | 6/1954 | Bowen | 116/294 X |
| 2,803,137 | 8/1957 | Bradley | 73/363.7 |
| 2,924,330 | 2/1960 | Ballard | 206/493 X |
| 2,966,261 | 12/1960 | Bradbury | 116/221 X |
| 3,214,278 | 10/1965 | Mylo | 116/221 X |
| 3,291,617 | 12/1966 | Barker et al. | 116/221 X |
| 3,425,392 | 2/1969 | Bond | 116/297 |
| 3,813,942 | 6/1974 | Guth | 73/363.9 X |
| 4,081,999 | 4/1978 | Lenken | 73/363.7 X |

FOREIGN PATENT DOCUMENTS 449250 11/1946 Canada .................. 116/294

OTHER PUBLICATIONS

Publ. "Wahl Surface Temperature Thermometers", William Wahl Corporation, 1977, six pages.

Primary Examiner—Daniel M. Yasich
Attorney, Agent, or Firm—Lawrence G. Zurawsky

[57] ABSTRACT

Tamper proof apparatus for verification that a critical temperature has been reached or exceeded includes a permanently sealed casing and cap containing a thermal element connected to a rotatable cam having a temperature indicator extending outwardly therefrom adapted to rest under a transparent window in the cap when critical temperature has been reached. Maximum and minimum temperature stops on the cap prevent movement of the indicator beyond preselected positions. An opening through the cap engages a removable shipping pin cooperating with either the maximum or minimum temperature stop to prevent movement of the indicator during shipment or storage. A locking spring connected to the cap traverses the lateral surface of the cam until the spring engages a shoulder formed in the cam. The shoulder and spring have, respectively, a first spur and a second spur that engage in permanently locked position when a critical temperature has been reached. As described heretofore, the cam, spring, and maximum and minimum temperature stops can be arranged, prior to sealing the cap and casing to indicate that either a maximum or a minimum temperature has been reached. Another embodiment has two separate spring mounting positions, and two separate cam shoulders, which alternatively can be arranged, prior to sealing, to verify that either a maximum or a minimum has been reached.

14 Claims, 9 Drawing Figures

TEMPERATURE VERIFICATION APPARATUS

BACKGROUND OF THE INVENTION

1. Field of the Invention

This invention relates to tamper proof critical temperature verification apparatus and more particularly to critical temperature verification apparatus having a permanently sealed casing within which a temperature indicator can be permanently locked in visible position by cooperation of a locking spring and a cam and a shoulder adapted to engage the locking spring at the critical temperature.

2. Description of the Prior Art

In the storage, transportation and use of many materials such as food, medical vaccines, bonding agents, insulating materials, industrial compounds and mixtures, and the like, it is important to know when, or if, a preselected or critical high or low temperature condition has occurred. Various temperature indicators have been suggested to record occurrence of critical temperature conditions. U.S. Pat. No. 4,081,999 describes such a device having a temperature responsive bimetallic coil connected to a rotating indicator which traverses a temperature scale having selected portions of the face of the scale bent outwardly to define an inclined plane member in the path of the indicator. The indicator is sufficiently resilient to permit unobstructed movement over the inclined plane in one direction while insuring latching behind the outwardly bent inclined plane upon movement in the opposite direction. That device permits easy and arbitrary manual resetting of the indicator and is so constructed that movement or vibration could dislodge the indicator and destroy the critical temperature verification.

U.S. Pat. No. 3,291,617 discloses a device having a spring loaded, temperature responsive bimetallic indicator strip enclosed in a circular case having upper and lower case members. The strip is held in original position by a first stop member extending inwardly from the upper case member until the attainment of a preselected minimum temperature which causes bending of the strip to permit its passage past the first stop member. The strip is then held in position by a second stop member extending inwardly from the lower case member until increasing temperature bends the strip in the opposite direction thus permitting passage of the strip past the second stop member into a final resting warning position. That device can be improperly activated by movement, vibration, or physical shock and can be readily and arbitrarily reset.

In an advertising brochure published in 1977 by William Wahl Corporation of Los Angeles, Calif., No. W-610D, Revision B, entitled "Wahl Surface Temperature Thermometers", there are described several temperature devices designed for mounting on the surfaces of industrial machinery and equipment. Certain of the devices described therein have a temperature responsive bimetallic coil connected to a rotatable pointer which traverses a temperature scale and which is constructed to drive, in a single preselected direction, a color coded recording hand which records either a maximum or minimum temperature reached since the last setting. That device permits easy, arbitrary manual resetting of the recording hand at the discretion of the user or operator.

U.S. Pat. No. 2,966,261 describes a spring loaded indicator temporarily maintained in position by a temperature responsive bimetallic keeper element which flexes with temperature change to release the spring loaded signal element. The device is enclosed in a sealed housing which inhibits tampering and precludes resetting of the device. A retaining rod, inserted through the device during shipment, prohibits normal action of the device until the retaining rod is removed. The free end of the spring loaded signal element engages a fixed keeper element until temperature variation causes the bimetallic signal element to disengage itself from the keeper and assume the warning position. With the retaining rod removed, vibration or physical shock can dislodge the spring loaded signal element from engagement with the keeper prematurely. In addition, the opening in the casing which previously held the retaining rod for shipment, must be sealed before use of the device to prevent tampering by reinsertion of the retaining rod or its equivalent to prevent movement of the signal element in response to temperature change.

U.S. Pat. No. 3,214,278 describes a device constructed to indicate attainment of a critical low temperature and subsequent attainment of a critical high temperature having a temperature responsive bimetallic element which, upon temperature decline, exposes a color coded low temperature indicator to view beneath a transparent window in the housing of the device. At the critical low temperature position, further movement of indicator elements in response to the decreasing temperature is prevented by a traverse member having a series of inclined planes. Subsequent increase in temperature causes the bimetallic element to drive the indicator elements in the opposite direction along the inclined planes until a second, high temperature indicator is moved into view beneath the transparent window in the housing. Subsequent temperature decrease will not cause removal of the high temperature indicator from view because the inclined plane prevents such reverse movement. Movement, vibration or physical shock can dislodge or otherwise disturb the structural elements of that device, thereby rendering inaccurate the temperature indication condition.

U.S. Pat. No. 3,813,942 discloses a washing machine having a high temperature indicator comprising a pointer attached to a bimetallic coil. Movement of the coil and pointer in response to temperature change is prevented by a stop rod that rests against a pivoted plate until the washing machine pump is activated to drain the machine. Activation of the pump displaces the pivot plate to release its frictional engagement with the end of the stop rod, thereby permitting movement of the coil and pointer to indicate the attainment of high temperature. Vibration or physical shock imparted to the washing machine during operation can cause malfunction of the temperature device. In addition, the locking means and temperature indicator are released upon activation of the next operational cycle of the washing machine and inadvertent activation of that cycle can cause unintentional destruction of the temperature verification.

There remains a need for a simply constructed, stable, tamper proof, critical temperature verification apparatus that provides a permanently locked and stable critical temperature indicator that is resistive to vibration or physical shock.

SUMMARY OF THE INVENTION

In accordance with the present invention there is provided a critical temperature verification apparatus that includes a case and a cap having a transparent window in the cap. A temperature responsive bimetallic element is mounted in the case and has one end free to move in response to temperature variation. A rotatable cam is connected to the free end of the bimetallic element. A temperature indicator integral with the cam is arranged to travel into view under the transparent window on the attainment of a preselected critical temperature. A first locking assembly is provided on the cam. A second locking assembly supported within the case is adapted to engage the first locking assembly in fixed connection upon attainment of the preselected critical temperature. Retaining means within the case are arranged to maintain the temperature indicator in view under the window continuously after the attainment of the preselected critical temperature.

Accordingly, it is an object of the present invention to provide a critical temperature verification apparatus that is permanently sealed and tamper proof and that has a stable locking assembly that provides permanent verification of attainment of a preselected critical temperature.

Another object of the present invention is to provide a critical temperature verification apparatus that can be preset to indicate attainment of a preselected critical temperature and which thereafter can be sealed permanently to prevent tampering.

A further object of the present invention is to provide a critical temperature verification apparatus that can be preset, sealed and locked for transportation or storage prior to use and which thereafter can be readily activated for use.

Those and other objects of the present invention will be more completely disclosed and described in the following specification, the accompanying drawings and the appended claims.

DESCRIPTION OF THE PREFERRED EMBODIMENT

Figure 1:
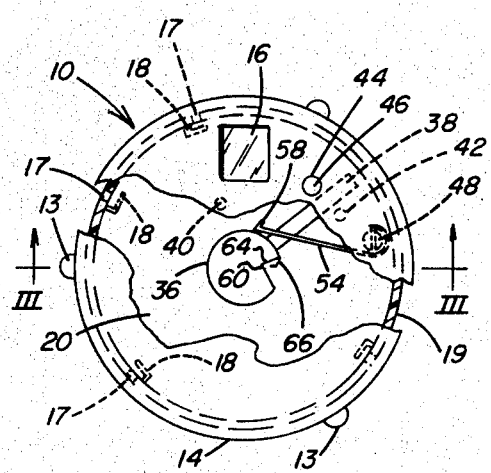
FIG. 1 is a partially fragmented top plan view illustrating an improved apparatus for verification of attainment of a critical minimum temperature with the structural elements locked in preset position for transportation or storage.
Figure 2:
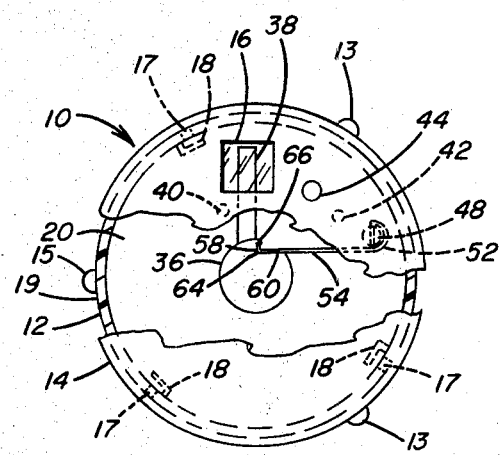
FIG. 2 is a partially fragmented top plan view of a critical temperature verification apparatus illustrating the structural elements thereof locked in position for verification of the attainment of a critical minimum temperature.
Figure 3:
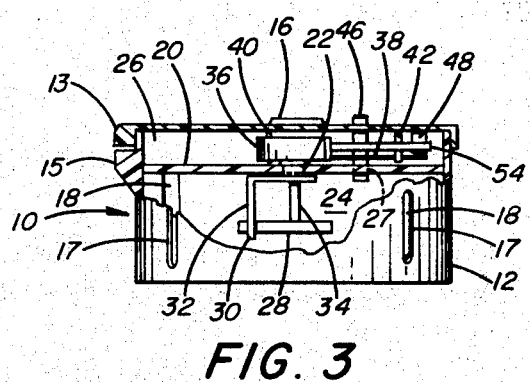
FIG. 3 is a partially fragmented side elevation taken generally along the line III—III of FIG. 1 and illustrating the arrangement of the bimetallic elements, cam and flexible locking member.

Referring to the drawings, and particularly to FIGS. 1 through 3, there is illustrated a critical temperature verification apparatus designated generally by reference numeral 10 having a case 12 and a cap 14. When the temperature verification apparatus 10 is assembled for use, case 12 and cap 14 are permanently sealed together by any suitable means such glue, resin, or other suitable bonding agent (not shown in the drawings). A transparent window 16 is enclosed in cap 14.

A plurality of apertures 17 are formed in sidewall 19 of case 12 to provide communication with the ambient environment. A plurality of support ribs 18 extend inwardly from the lower portion of the sidewall 19 of case 12 adjacent each aperture 17. Each support rib 18 is constructed and arranged to form a baffle internally behind the adjacent aperture 17 to prevent insertion through the aperture 17 of objects that might be used to disturb or tamper with the internal structural elements of the critical temperature verification apparatus 10. Although apertures 17 are shown in the present embodiment of the invention as elongated vertical slots, other suitable configurations of apertures 17 can be employed to provide communication with ambient temperature conditions.

A mounting plate 20 is enclosed within case 12 and rests upon the upper edges of supporting ribs 18. Mounting plate 20 is constructed and arranged to remain in stable, fixed position within case 12 either by bonding or other suitable means. Mounting plate 20 has a first central opening 22 extending therethrough and separates the interior of case 12 into a lower chamber 24 and an upper chamber 26. Mounting plate 20 also has a second pin opening 27 therethrough adapted to slideably engage a shipping pin which is described more fully below. The upper ends of apertures 17 are spaced below the level of mounting plate 20 to prevent access to upper chamber 26 while permitting communication of ambient temperature to lower chamber 24.

Referring to FIG. 3, a temperature responsive bimetallic element 28, which can be a bimetallic coil or similar device, is enclosed within lower chamber 24 of casing 12 and has one end 30 connected to the lower surface of mounting plate 20 by a fixed, rigid mounting bracket 32. A rotatable shaft 34 is connected at its lower end to the free end of bimetallic element 28 and extends upwardly through central opening 22 in mounting plate 20 into upper chamber 26 of case 12. In response to temperature variation, the free end of bimetallic element 28 moves in an arcuate path, thereby rotating shaft 34.

A rotatable cam 36 is connected to the upper end of shaft 34 and is supported on the upper surface of mounting plate 20. A temperature indicator 38 is connected at one end to the lateral surface of cam 36 and extends outwardly therefrom.

Referring to FIGS. 1 and 2, there are shown a minimum temperature stop 40 and a maximum temperature stop 42 connected to the internal surface of cap 14 and extending downwardly into upper chamber 26 of case 12 and constructed and arranged to prevent movement of temperature indicator 38 beyond points corresponding to a preselected minimum critical temperature and a preselected maximum critical temperature, respectively.

As shown in FIG. 3, minimum temperature stop 40 and maximum temperature stop 42 are not in contact with mounting plate 20. Alternatively, minimum temperature stop 40 and maximum temperature stop 42 can be in contact with mounting plate 20 to provide greater stability and greater shock resistance.

Cap 14 contains an opening 44 adapted to engage a shipping pin 46 located with respect to maximum temperature stop 42 to engage temperature indicator 38 in locked position between maximum temperature stop 42 and shipping pin 46 during shipping or storage of the apparatus 10. Shipping pin 46 extends through, and is slideably engaged in, pin opening 27 in mounting plate 20 to assure that temperature indicator 38 does not move past shipping pin 46 as a result of physical shock during transportation or storage of critical temperature verification device 10.

A mounting post 48 connected to cap 14 extends downwardly into upper chamber 26 of case 12 and has a slot 50 in the lower end thereof adapted to engage in fixed connection one end 52 of a flexible locking member 54, which can be a leaf spring or other similar device.

Figure 4:
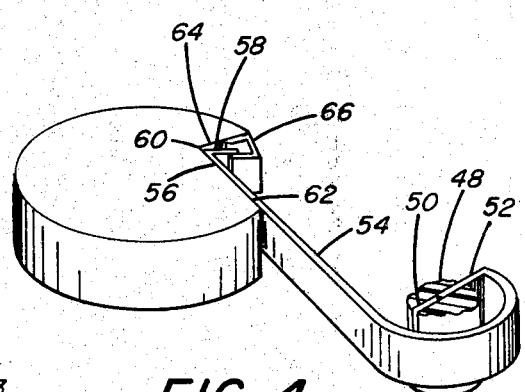
FIG. 4 is an isometric view of the cam and flexible locking member in locked engagement for verification of a critical minimum temperature.

Referring to FIGS. 1 and 4 there is shown a locking shoulder 60 formed in the edge of cam 36 by shoulder walls 62 and 64. A female locking spur 66 is connected to and extends outwardly from wall 64 of shoulder 60 in spaced relation from wall 62 of shoulder 60. Female locking spur 66 can be either a separate structural member rigidly connected to wall 64 of shoulder 60 or can be integral with wall 64 of shoulder 60. Flexible locking member 54 has a free end 56 from which there extends a male locking spur 58 adapted to engage female locking spur 66 in permanent, stable locked engagement. Flexible locking member 54 can be made of any suitable material having sufficient strength and rigidity to remain in fixed locked position and prevent return of cam 36 once male locking spur 58 has engaged female locking spur 66. It should be recognized that one or both of the male locking spur 58 and the female locking spur 66 should be resilient to permit their engagement and to preclude their subsequent disengagement. If desired in a particular application of the apparatus of this invention, alternative structure can be provided for the locking spurs described herein. For example, female locking spur 66 can be provided on the free end 56 of flexible locking member 54 and male locking spur 58 can be provided on wall 64 of shoulder 60.

FIGS. 1 through 4 illustrate an embodiment of this invention in which the structural elements of the apparatus are constructed, arranged and preset to provide permanent, stable, locked, tamper proof verification that a critical minimum temperature has been attained. In that embodiment, bimetallic element 28 and cam 36 are adapted to rotate in a counterclockwise direction in response to decreasing temperature, temperature indicator 38 is preset to pass into view under transparent window 16 when a preselected critical minimum temperature has been attained, and minimum temperature stop 40 is located near the left portion of transparent window 16 to prevent further movement of temperature indicator 38 out of the field of view through window 16. Flexible member 54 and cam 36 are constructed and arranged to permit the free end 56 of flexible locking member 54 to traverse the lateral surface of cam 36 during counterclockwise rotation of cam 36 in response to decreasing ambient temperature until the free end 56 of flexible locking member 54 engages shoulder wall 62 on cam 36 to permit engagement of male locking spur 58 with female locking spure 66. Once the locking spurs are secured in locked engagement, flexible locking member 54 prevents clockwise rotation of cam 36 and temperature indicator 38 that would otherwise occur in the event of an increase in ambient temperature. Interaction between cam 36 and flexible locking spring member 54 in combination with minimum temperature stop 40 maintains temperature indicator 38 permanently in view under window 16 regardless of subsequent variations in ambient temperature.

Figure 5:
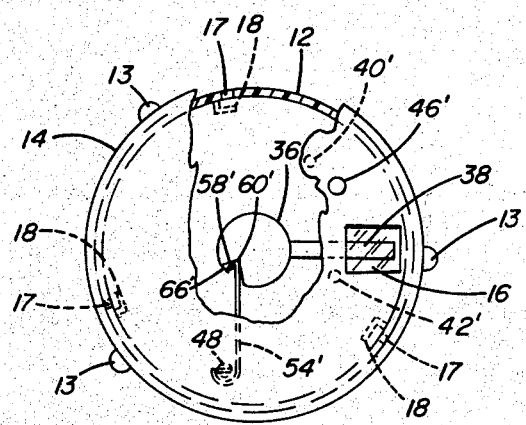
FIG. 5 is a partially fragmented top plan view illustrating the cam and flexible locking member in locked engagement arranged for verification of attainment of a critical maximum temperature.

In FIG. 5, there is shown another embodiment of the apparatus of this invention in which the structural elements of the apparatus are arranged and constructed to provide permanent verification of the attainment of a preselected critical maximum temperature. In FIG. 5, elements of structure that are similar to related elements of structure appearing in FIGS. 1 through 4 are referred to by primed referenced numerals. In the apparatus shown in FIG. 5, a minimum temperature stop 40' is positioned on cap 12 at a location laterally displaced from the left side of window 16. Opening 44' and shipping pin 46' in cap 12 are located between minimum temperature stop 40' and the left side of window 16 in cap 12. Maximum temperature stop 42' is positioned on cap 12 closer to the right side of window 16 to prevent movement of temperature indicator 38 past window 16 if the ambient temperature exceeds a preselected critical maximum temperature.

In the embodiment of the apparatus as shown in FIG. 5, locking shoulder 60' on cam 36 and female locking spur 66' are constructed and arranged on cam 36 in a manner that constitutes a mirror image of the equivalent structural elements in the apparatus embodiment shown in FIGS. 1 through 4. In addition, flexible locking member 54', as shown in FIG. 5, is so mounted that flexible locking member 54' has been rotated about its longitudinal axis 180 degrees from the position shown in the embodiment illustrated in FIGS. 1 through 4. The embodiment of the apparatus as shown in FIG. 5 is adapted for use in an environment in which an increase in ambient temperature to at least a preselected maximum critical temperature might be anticipated. Cap 14 is positioned and sealed onto case 12 in a manner that assures that temperature indicator 38 will be positioned in view under window 16 when the critical maximum temperature has been reached. Maximum temperature stop 42' prohibits further movement of temperature indicator 38 and cam 36 in a further clockwise direction in response to temperature increase beyond the critical maximum temperature. Cam 36 rotates in a clockwise direction in response to increasing temperature and flexible locking member 54' traverses the lateral surface of cam 36 until the critical maximum temperature is attained, at which time flexible locking member 54' seats in shoulder 60' bringing male locking spur 58' and female locking spur 66' into fixed locked engagement. The locking action of flexible locking member 54' and cam 36 prevents counterclockwise rotation of cam 36 and temperature indicator 38 in response to subsequent decrease in ambient temperature, thereby providing permanent visual indication that the critical maximum temperature previously has been attained.

Additional preferred embodiments of the apparatus of this invention are shown in FIGS. 6 through 9 which illustrate apparatus constructed and arranged so that the only change necessary to convert the apparatus from a minimum temperature indicator to a maximum temperature indicator, or vice versa, is the relocation of the flexible locking member. In that embodiment, cap 12 has a pair of transparent windows 70 and 72 spaced apart on cap 12. The mutual spacing of windows 70 and 72 on cap 12 can be adapted to accommodate the temperature range and responsive movement of the cam and indicator between the maximum and minimum temperatures anticipated in the environment of use. A minimum temperature stop 74 connected to cap 12 is located below and aligned with the left side of window 70. A maximum temperature stop 76 is connected to cap 12 and is located below and aligned with the right side of window 72. An opening 78 in cap 12 engages a shipping pin 80. A second opening 82 in cap 12 engages a second shipping pin 84. Openings 78 and 82 and shipping pins 80 and 84 are mutually spaced from each other and are located between windows 70 and 72.

Referring to FIGS. 6 through 9, cam 86 is provided with a minimum temperature locking shoulder 88 and first female locking spur 90 and a maximum temperature locking shoulder 91 and second female locking spur 92. A temperature indicator 94 is connected to the lateral surface of cam 86 extending outwardly therefrom at a location adjacent minimum temperature locking shoulder 88.

Figure 6:
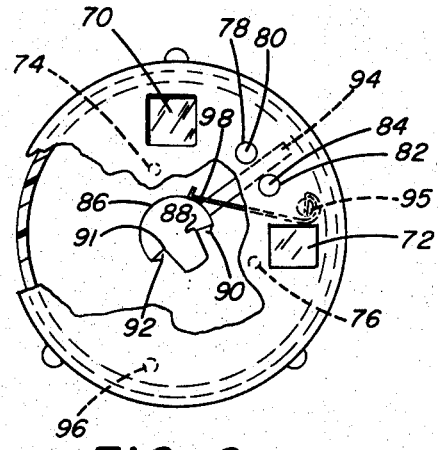
FIG. 6 is a partially fragmented top plan view of a dual purpose critical temperature verification apparatus showing the cam and flexible member arranged to provide verification of attainment of a critical minimum temperature with the preset apparatus locked in position for transportation or storage.
Figure 7:
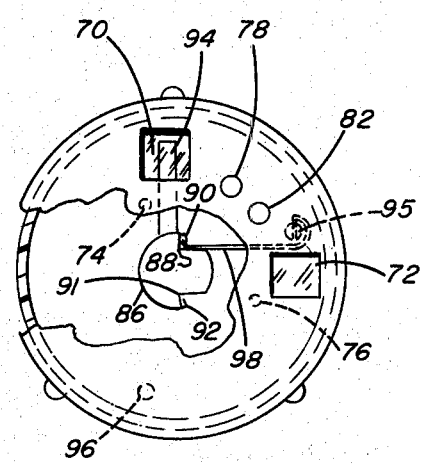
FIG. 7 is a partially fragmented top plan view of a dual purpose critical temperature verification apparatus showing the cam and flexible locking member in locked engagement for verification of attainment of a critical minimum temperature.
Figure 8:
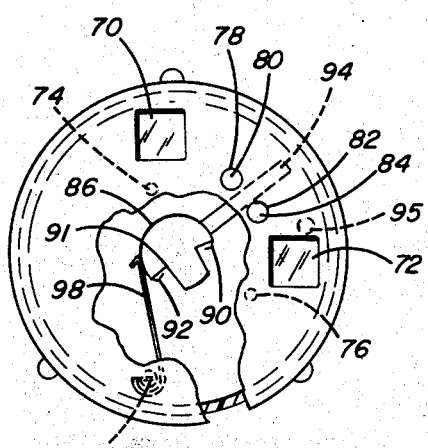
FIG. 8 is a partially fragmented top plan view of a dual purpose critical temperature verification apparatus showing the cam and flexible locking member arranged for verification of attainment of a critical maximum temperature.
Figure 9:
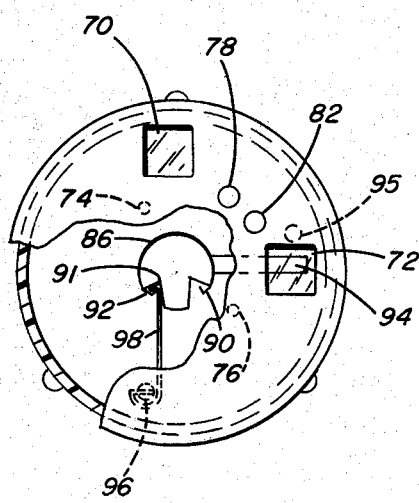
FIG. 9 is a partially fragmented top plan view of a dual purpose critical temperature verification apparatus showing the cam and flexible locking member locked in position for verification of attainment of a critical maximum temperature.

The instant embodiment of this invention has a minimum temperature flexible locking member mounting post 95 and a maximum temperature flexible locking member mounting post 96 each connected to cap 12. Referring to FIGS. 6 and 7, the instant embodiment of the apparatus of this invention is shown as arranged for the verification of attainment of a critical minimum temperature with flexible locking member 98 connected to mounting post 95 and adapted to engage minimum temperature locking shoulder 88 and first female locking spur 90. Referring to FIGS. 8 and 9, the instant embodiment of the apparatus of this invention is shown with flexible locking member 98 connected to mounting post 96 and arranged to engage maximum temperature locking shoulder 91 and second female locking spur 92 to provide permanent verification that a critical maximum temperature has been attained.

In the use of the apparatus of this invention, the bimetallic element, cam, flexible locking member and temperature stops are adapted, constructed and arranged in combination with the placement of cap 12 to assure that the temperature indicator passes into view under the transparent window in the cap and is permanently locked in that position upon the attainment of a preselected critical temperature. As shown in FIGS. 1 through 5, cap 14 can be provided with a plurality of cap alignment tabs 13 spaced around the outer lateral surface of cap 14 and arranged for alignment with a plurality of similar case alignment tabs 15 spaced around the outer upper surface of case 12. The cap alignment tabs 13 and case alignment tabs 15 are adapted to assure that, with respect to particular anticipated temperature conditions in use, the operative structural elements such as the cam, temperature indicator, temperature stops and flexible locking member are properly positioned and preset to fixedly lock the temperature indicator in view under the transparent window upon the attainment of the preselected critical temperature.

Assembly of the critical temperature verification apparatus is conducted in a temperature controlled environment adapted to assure that the temperature indicator is in position to permit locking the temperature indicator for shipment and storage between the shipping pin and either the minimum temperature stop or the maximum temperature stop, as desired, prior to sealing the cap and case. Alternatively, the case can be provided with a removable bottom that permits access to the shaft for manual setting of the temperature indicator prior to shipment. The removable bottom of case 12 can then be permanently sealed in the case in the same manner as cap 14. With the apparatus of this invention as shown in FIGS. 6 through 9, the structural elements are properly arranged in a temperature controlled environment and one of the shipping pins 80 and 84 is inserted. The temperature is changed to bring the temperature indicator into engagement with that shipping pin, after which the second shipping pin is inserted.

To use the apparatus of this invention in the desired environment, it is necessary only to remove the shipping pin or pins and observe the apparatus periodically to determine if the temperature indicator is in view under the transparent window. If desired, the opening created in the cap by removal of the shipping pin can be closed by the use of sealing wax or any other suitable material.

The apparatus of this invention can be constructed of inexpensive, disposable materials. The casing and cap are sealed in a manner to assure that opening of the apparatus after its initial sealing is readily detectable. In addition, the apparatus can be marked with a unique identifying serial number and with the applicable preselected minimum and maximum temperatures all of which can be recorded for later reference and control by the manufacturer prior to shipment and by the user prior to use. The apparatus of this invention provides a tamper proof, strong, stable visual verification that a preselected critical temperature has been attained.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Critical temperature verification apparatus comprising,
a case,
a cap connected to the top of said case,
a transparent window enclosed within said cap,
temperature responsive means mounted within said case having a portion of said temperature responsive means free to move in an arcuate path in response to temperature variation,
a rotatable cam connected to said free portion of said temperature responsive means within said case and adapted to rotate in response to temperature variation, a temperature indicator connected to said cam and extending outwardly therefrom within said case and adapted to travel into view under said window in response to attainment of a preselected critical temperature, first locking means integral with a portion of the lateral surface of said cam, second locking means connected to said cap within said case and having a portion of said second locking means adapted to traverse said lateral surface of said cam upon rotation thereof and further adapted to engage in fixed connection said first locking means upon the attainment of said preselected critical temperature, and stop means connected to said cap within said case adapted to engage said temperature indicator to prevent further movement of said temperature indicator in response to further temperature variation beyond said preselected critical temperature.

2. Critical temperature verification apparatus as set forth in claim 1 wherein said cap is permanently sealed and connected to said case.

3. Critical temperature verification apparatus as set forth in claim 1 including, a mounting plate mounted within said case and spaced from said cap, said mounting plate having a central opening therethrough adapted to engage connecting means connecting said cam to said temperature responsive means.

4. Critical temperature verification apparatus as set forth in claim 3 wherein, said mounting plate devides the interior of said case into an upper chamber and a lower chamber, said temperature responsive means has one portion thereof fixedly connected to said mounting plate within said lower chamber of said case, and said cam is rotatably supported on said mounting plate within said upper chamber of said case.

5. Critical temperature verification apparatus as set forth in claim 4 wherein, said temperature responsive means comprise a bimetallic coil having one end of said coil fixedly connected to said mounting plate and having the other end of said bimetallic coil free to move in an arcuate path in response to temperature variation, a shaft having one end connected to said free end of said bimetallic coil, said shaft extending upwardly from said coil through said central opening in said mounting plate and rotatable therein, said cam being connected to the other end of said shaft distant from said bimetallic coil within said upper chamber of said case.

6. Critical temperature verification apparatus as set forth in claim 1 wherein said stop means comprise, a first rigid stop member depending from said cap within said upper chamber of said case and adapted to engage said temperature indicator to prevent movement of said temperature indicator past said first stop member in response to temperature variation below a preselected minimum temperature, a second stop member depending from said cap into said upper chamber of said case displaced from said first stop member and adapted to engage said temperature indicator to prevent movement of said temperature indicator past said second stop member in response to temperature variation above a preselected maximum temperature.

7. Critical temperature verification apparatus as set forth in claim 1 wherein, said first locking means comprises a shoulder formed in the lateral surface of said cam and adapted to engage a portion of said second locking means, a first locking spur extending from one surface of said shoulder, said second locking means comprising an elongated locking member connected at one end to a mounting post depending downwardly from said cap within said upper chamber of said case and having said opposite end of said elongated locking member adapted to contact and traverse the lateral surface of said rotatable cam and engage said shoulder of said cam upon the attainment of said preselected critical temperature, a second locking spur extending from said free end of said elongated locking member and adapted to engage said first locking spur in fixed engagement upon the attainment of said preselected critical temperature.

8. Critical temperature verification apparatus as set forth in claim 7 wherein said elongated locking member comprises a leaf spring.

9. Critical temperature verification apparatus as set forth in claim 1 including an opening through said cap, a shipping pin slideably engaged within said opening through said cap and extending through said upper chamber of said case in spaced relation with said stop means, said shipping pin adapted to secure said temperature indicator between said shipping pin and said stop means to prevent movement of said temperature indicator during transportation and storage of said temperature verification apparatus.

10. Critical temperature verification apparatus comprising, a case, a cap permanently sealed and connected to the top of said case, a mounting plate secured within said case and displaced from said cap, said mounting plate having a central opening therethrough, said mounting plate dividing the interior of said case into an upper chamber and a lower chamber, a temperature responsive bimetallic member enclosed within said lower chamber of said case and having one end of said bimetallic member fixedly connected to said mounting plate and the other end of said bimetallic member free to move in an arcuate path in response to temperature variation, a shaft having one end connected to the free end of said bimetallic member and extending upwardly therefrom through said central opening in said mounting plate into said upper chamber of said case, a rotatable cam connected to the upper end of said shaft within said upper chamber of said casing and supported on said mounting plate, a transparent window mounted within said cap, a temperature indicator connected to the lateral surface of said cam and extending therefrom adapted to move into view under said window in response to attainment of a preselected critical temperature, a minimum temperature stop member connected to said cap and extending downwardly into said upper chamber of said case adapted to engage said temperature indicator and prevent movement of said temperature indicator past said minimum temperature stop member, a maximum temperature stop member connected to said cap and extending downwardly into said upper chamber of said case adapted to engage said temperature indicator and prevent movement of said temperature indicator past said maximum temperature stop member, an opening through said cap, a removable shipping pin extending through said opening in said cap into said upper chamber of said casing, said shipping pin located in said cap in spaced relation with said minimum temperature stop member and said maximum temperature stop member and adapted to engage said temperature indicator between said shipping pin and one of said minimum temperature stop member and said maximum temperature stop member to prevent movement of said temperature indicator during transportation and storage of said temperature verification apparatus, a locking shoulder integral with a portion of the lateral surface of said cam formed by a first shoulder wall connecting with a second shoulder wall formed in lateral surface of said cam, a first locking spur extending outwardly from said first shoulder wall of said locking shoulder and spaced from said second wall of said locking shoulder, a mounting post connected to said cap and extending therefrom into said upper chamber of said case, an elongated locking member having one end fixedly connected to said mounting post and the other end of said elongated locking member in slideable contact with the lateral surface of said rotatable cam, said elongated locking member adapted to traverse the lateral surface of said rotatable cam in response to temperature variation and adapted to engage said second wall of said locking shoulder on said cam upon the attainment of said preselected critical temperature, a second locking spur extending from said free end of said elongaged member and adapted to engage in fixed locked connection with said first locking spur upon the attainment of said preselected critical temperature, said elongated locking member, said cam, and one of said minimum temperature stop member and said maximum temperature stop member adapted to cooperate in mutual combination to prevent further rotation of said cam subsequent to the attainment of a preselected critical temperature.

11. Critical temperature verification apparatus comprising a case, a cap permanently sealed and connected to the top of said case, a first transparent window enclosed with said cap, a second transparent window enclosed within said cap in spaced relation with first transparent window, a minimum temperature stop member connected to said cap and extending into said case and aligned with said first transparent window, a maximum temperature stop member connected to said cap and extending into said case and aligned with said second transparent window, a mounting plate enclosed within said case and connected thereto in spaced relation to said cap, said mounting plate having a central opening therethrough, said mounting plate dividing the interior of said case into an upper chamber and a lower chamber, a temperature responsive bimetallic coil element enclosed within said lower chamber of said case and having one end of said bimetallic element fixedly connected to said mounting plate and the other end of said bimetallic element free to move in an arcuate path in response to temperature variation, a shaft connected to said free end of said bimetallic element and extending therefrom through said central opening in said mounting plate and rotatable therein, a cam connected to said upper end of said shaft displaced from said bimetallic coil and supported on said mounting plate within said upper chamber of said case, a temperature indicator connected to a portion of the lateral surface of said cam and extending therefrom adapted to travel into view under said first transparent window in response to attainment of a preselected minimum temperature and adapted to travel into view under said second transparent window in response to attainment of a preselected maximum temperature, said cam having integral with the lateral surface thereof a minimum temperature locking shoulder and a maximum temperature locking shoulder spaced from said minimum temperature locking shoulder, said minimum temperature locking shoulder having a first minimum temperature locking spur extending outwardly therefrom, said maximum temperature locking shoulder having a first maximum temperature locking spur extending outwardly therefrom, a minimum temperature mounting post connected to said cap and extending into said upper chamber of said case, a maximum temperature mounting post connected to said cap and extending therefrom into said upper chamber of said case and spaced from said minimum temperature mounting post, an elongated locking member having one end connected to one of said minimum temperature mounting post and said maximum temperature mounting post, said elongated locking member having a free end spaced from said connected end thereof and adapted to slideably engage the lateral surface of said rotatable cam, said elongated locking member having a second locking spur extending from said free end thereof, said elongated locking member, when connected to said minimum temperature mounting post, adapted to engage said minimum temperature locking shoulder of said cam and said first minimum temperature locking spur in fixed, locked engagement upon the attainment of a preselected minimum temperature, said elongated locking member, when connected to said maximum temperature mounting post, adapted to engage said maximum temperature locking spur in fixed, locked engagement upon the attainment of a preselected maximum temperature, a pair of removable shipping pins enclosed in said cap and extending therethrough into said upper chamber of said case in mutual spaced relation and adapted to engage said temperature indicator between said shipping pins to prevent movement of said temperature indicator during shipment and storage of said critical temperature verification apparatus.

12. Critical temperature verification apparatus comprising, a case, a cap connected to the top of said case, a transparent window enclosed within said cap, temperature responsive means mounted within said case and having a portion of said temperature responsive means free to move in response to temperature variation, cam means connected to said free portion of said temperature responsive means within said case and adapted to rotate in response to temperature variation, temperature indicator means integral with said cam means within said case and adapted to travel into view under said window in response to attainment of a preselected critical temperature, first locking means integral with a portion of said cam means, second locking means within and secured to said case, said first locking means arranged upon rotation of said cam means to engage said second locking means upon the attainment of said preselected critical temperature, and said first and second locking means in their engaged position being arranged to assure that said temperature indicator means remain in view under said window continuously after the attainment of said preselected critical temperature.

13. The apparatus of claim 12 wherein the said temperature indicator means remains continuously in view under the said window after the said first and second locking means are in their engaged positions.

14. The apparatus of claim 13 wherein a stop means is provided to prevent movement of said temperature indicator means out of view under said window.

* * * * *

UNITED STATES PATENT AND TRADEMARK OFFICE
CERTIFICATE OF CORRECTION

PATENT NO. : 4,341,118
DATED : July 27, 1982
INVENTOR(S) : Howard T. Schobl

It is certified that error appears in the above-identified patent and that said Letters Patent is hereby corrected as shown below:

On the title page, Item [73] should read -- Schobl Enterprises, Inc. --.

Signed and Sealed this

Twenty-fifth Day of October 1983

[SEAL]

Attest:

GERALD J. MOSSINGHOFF

Attesting Officer

Commissioner of Patents and Trademarks